United States Patent
Park et al.

(10) Patent No.: US 7,424,180 B2
(45) Date of Patent: Sep. 9, 2008

(54) HIGH POWER PLANAR LIGHTWAVE CIRCUIT OPTICAL TX MODULE AND TX/RX MODULE

(75) Inventors: Sung Woong Park, Gyeonggi-do (KR); Dong Soo Lee, Gwangjoo (KR); Bin Yeong Yoon, Daejeon (KR); Jong Deog Kim, Gwangjoo (KR); Mun Seob Lee, Daejeon (KR); Young Tak Han, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 0 days.

(21) Appl. No.: 11/451,061

(22) Filed: Jun. 12, 2006

(65) Prior Publication Data
US 2007/0133923 A1    Jun. 14, 2007

(30) Foreign Application Priority Data
Dec. 9, 2005    (KR) ............... 10-2005-0120995

(51) Int. Cl.
*G02B 6/12*    (2006.01)
(52) U.S. Cl. ............................ 385/14; 385/49
(58) Field of Classification Search .............. 385/14, 385/49
See application file for complete search history.

(56) References Cited

U.S. PATENT DOCUMENTS 6,313,938 B1    11/2001    Shikii et al.
6,542,268 B1 *    4/2003    Rotolo et al. ............... 398/68
7,236,656 B2 *    6/2007    Welch et al. ................ 385/14
2003/0214698 A1 *    11/2003    Ohara et al. ............... 359/328
2004/0067006 A1 *    4/2004    Welch et al. ................ 385/14

(Continued)

FOREIGN PATENT DOCUMENTS

| JP | 11 54842 | 2/1999 |
|---|---|---|
| JP | 2005 175021 | 6/2005 |
| KR | 1020050038546 | 4/2005 |
| KR | 1020050071312 | 7/2005 |

OTHER PUBLICATIONS

'A 10 Gb/s Hybrid-Integrated Receiver Array Module Using a Planar Lightwave Circuit (PLC) Platform Including a Novel Assembly Region Structure' Mino et al., Journal Of Lightwave Technology, vol. 14, No. 11, pp. 2475-2482.

*Primary Examiner*—Ellen Kim
(74) *Attorney, Agent, or Firm*—Ladas & Parry LLP

(57) ABSTRACT

Provided are high power PLC optical Tx module and PLC optical Tx/Rx module. The PLC optical Tx/Rx module is located in an OLT of a PON system. The high power PLC optical Tx/Rx module includes a photodiode, a laser diode, an SOA, an optical coupler, and a PLC platform. The photodiode converts an input optical signal into an electrical signal, and the laser diode generates an optical signal of a predetermined wavelength. The SOA amplifies the optical signal generated by the laser diode, and the optical coupler couples optical signals, outputs the coupled signal to a splitter, divides an optical signal from the slitter, and outputs the divided signals to the photodiode. The PLC platform incorporates the photodiode, the laser diode, the SOA, and the optical coupler into one package to allow an optical signal to be output with high power.

20 Claims, 6 Drawing Sheets

U.S. PATENT DOCUMENTS

| | | | |
|---|---|---|---|
| 2005/0013568 A1* | 1/2005 | Handelman | 385/122 |
| 2005/0135449 A1* | 6/2005 | Sorin et al. | 372/50 |
| 2005/0276613 A1* | 12/2005 | Welch et al. | 398/172 |
| 2006/0133730 A1* | 6/2006 | Shin et al. | 385/37 |
| 2007/0019967 A1* | 1/2007 | Akiyama et al. | 398/159 |
| 2007/0122148 A1* | 5/2007 | Welch et al. | 398/27 |

* cited by examiner

HIGH POWER PLANAR LIGHTWAVE CIRCUIT OPTICAL TX MODULE AND TX/RX MODULE

CROSS-REFERENCE TO RELATED PATENT APPLICATION

This application claims the benefit of Korean Patent Application No. 10-2005-0120995, filed on Dec. 9, 2005, in the Korean Intellectual Property Office, the disclosure of which is incorporated herein in its entirety by reference.

BACKGROUND OF THE INVENTION

1. Field of the Invention

The present invention relates to high power planar Lightwave circuit (PLC) optical transmission (Tx) module and Tx/reception (Rx) module, and more particularly, to high power PLC optical Tx module and Tx/Rx module that incorporates a laser diode (LD) generating an optical signal, a semiconductor optical amplifier amplifying the optical signal, and/or a photodiode converting the optical signal into an electrical signal on one PLC platform in order to provide high optical power in a passive optical network (PON) system.

2. Description of the Related Art

A time division multiple access (TDMA) PON method is a standardized subscriber data transferring method using a fiber to the home (FTTH) network.

In a TDMA PON system, a plurality of subscribers shares an optical signal of one wavelength to transfer data. In the TDMA PON system, the output optical power of an optical Tx module (an optical Tx module for an optical line termination (OLT)) should be sufficiently large to allow a large number of subscribers, for example, more than 128, to share an optical signal of one wavelength.

Methods of increasing the output optical power include a method of increasing the output optical power of a laser diode (LD), which is an optical output device contained in an optical Tx module, and a method of increasing the output optical power by amplifying an optical signal generated by the LD of the optical Tx module using an optical amplifier.

However, there are limitations to increasing the LD's output optical power. Moreover, the method of increasing the optical power by adding an optical amplifier increases the costs and the size of the optical Tx module.

FIG. 1 is a block diagram of a network of a PON system using a conventional optical Tx module. Referring to FIG. 1, the PON system includes an OLT 100, an optical waveguide 120, a splitter 140, and a plurality of optical network terminations (ONTs) 160 that serve as subscriber terminals.

In the PON system, an optical signal is transferred from the OLT 100, which serves as a base station to the plurality of ONTs 160.

An optical signal of one wavelength generated by the OLT 100 is input to the splitter 140 through the optical waveguide 120.

The splitter 140 receives the optical signal of one wavelength, and splits the received optical signal into a plurality of signals having the same wavelength but lower optical power according to the number of branches. The split optical signals having reduced optical power are transferred to the plurality of ONTs 160.

The splitter 140 splits an optical signal into a plurality of optical signals having reduced optical power, and the optical power loss increases in proportion to the branch number. An excessively large number of branches results in an extreme decrease in the optical power, which makes it difficult to perform normal communication in the PON system.

Accordingly, in the PON system, the number of the ONTs 160 connected to one OLT 100 is determined by the optical power output from the OLT 100, optical power loss caused by optical branches at the splitter 140, and a power budget of another optical link.

For example, the splitter 140 illustrated in FIG. 1 may be a 1×16 splitter. Assuming that optical power required for normal communication is 0 dBm, it is possible to communicate with low optical power of approximately −6 dBm in the case of a 1×2 splitter. On the other hand, when a 1×128 splitter is used, high optical power of +10 dBm is needed for normal communication. That is, an optical signal output from the OLT 100 requires sufficient optical power to overcome optical power loss caused by the number of branches of the splitter 140 in order to secure as many ONTs 160 per OLT 100 as possible.

FIG. 2 is a block diagram of a conventional optical Tx module that can obtain high optical power. Referring to FIG. 2, the OLT 100 requires an optical Tx module having an optical power of more than +10 dBm in order to accommodate the ONTs 160 having 128 subscriber terminals.

However, since the output power of a conventional optical Tx module does not exceed +2 dBm, an optical amplifier should be connected to an output terminal of the optical Tx module to obtain an optical power of more than +10 dBm.

As illustrated in FIG. 2, the conventional high power optical Tx module includes an optical generator 200 generating an optical signal of one wavelength, and an optical amplifier 240 amplifying the generated optical signal.

The optical generator 200 includes a laser diode (LD) converting an electrical signal into an optical signal and outputting the optical signal, and a monitor photodiode (mPD) monitoring the optical signal output from the LD.

The optical signal generated by the optical generator 200 propagates to the optical amplifier 240 through an optical waveguide 220.

The optical amplifier 240 includes a semiconductor optical amplifier (SOA) amplifying the optical signal generated by the optical generator 200.

An optical connector 210 connects the optical generator 200 to the optical cable 220, an optical connector 230 connects the optical waveguide 220 to the optical amplifier 240, and an optical connector 250 connects the optical amplifier 240 to the ONTs 160 of FIG. 1.

When constructing a subscriber network using the PON system, the cost of the PON system is determined by the number of ONTs 160 connected to one OLT 100. A PON system including 16 to 32 ONTs 160 connected to one OLT 100 is widely used due to the limited optical power of the optical Tx module within the OLT 100.

Accordingly, if a method of increasing the optical power of the optical Tx module within the OLT 100 is available, up to 128 ONTs can be accommodated instead of just 32 ONTs. In other words, in order to connect a large number of ONTs 160 to one OLT 100, the optical power of the optical Tx module within the OLT 100 should be increased.

As mentioned above, the optical power can be increased by adding an optical amplifier to the optical Tx module. However, when adding the optical amplifier to the optical Tx module, the costs and the size of the optical Tx module increase because the optical generator 200 and the optical amplifier 240 are separately packaged.

SUMMARY OF THE INVENTION

The present invention provides planar lightwave circuit (PLC) optical transmission (Tx) and Tx/reception (Rx) modules capable of incorporating a laser diode (LD) generating an optical signal and a semiconductor optical amplifier (SOA) amplifying the optical signal into one package in order to increase the optical power of the optical Tx module and Tx/Rx module.

The present invention also provides PLC optical Tx module and Tx/Rx modules including a PLC platform that allows for a high degree of integration and thus a reduction in the size of the optical Tx module and Tx/Rx module, by incorporating an LD and an SOA into one package.

The present invention also provides PLC optical Tx and Tx/Rx modules in which a thermoelectric cooler is mounted on a PLC platform in order to solve a heat-emission problem of the optical Tx and Tx/Rx modules.

The present invention also provides PLC optical Tx and Tx/Rx modules that are hermetically sealed for isolation from the external atmosphere.

According to an aspect of the present invention, there is provided a high power planner lightwave circuit (PLC) optical transmission (Tx) module located in optical line terminal (OLT) of a passive optical network (PON) system, the PLC optical Tx module including: a laser diode (LD) generating an optical signal of a predetermined wavelength, a semiconductor optical amplifier (SOA) amplifying the optical signal generated by the LD and outputting the amplified optical signal to a splitter, a PLC platform incorporating the LD and the SOA into one package to allow the optical signal to be output with high power.

According to another aspect of the present invention, there is provided a high power PLC optical Tx/Rx module located in an OLT of a PON system, the PLC optical Tx/Rx module including: a photodiode converting an input optical signal into an electrical signal; an LD generating an optical signal of a predetermined wavelength; an SOA amplifying the optical signal generated by the LD; an optical coupler coupling the optical signal amplified by the SOA, outputting the coupled optical signal to the splitter, dividing an optical signal input from the splitter, and outputting the divided optical signals to the photodiode; and a PLC platform incorporating the photodiode, the laser diode, the SOA, and the optical coupler into one package to allow an optical signal to be output with high power.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
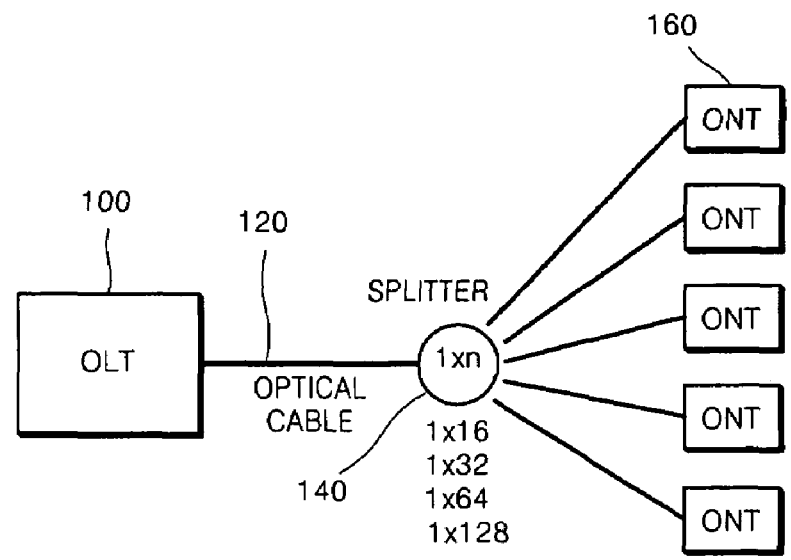
FIG. 1 is a block diagram of a network of a passive optical network (PON) system using a conventional optical transmission (Tx) module.
Figure 2:
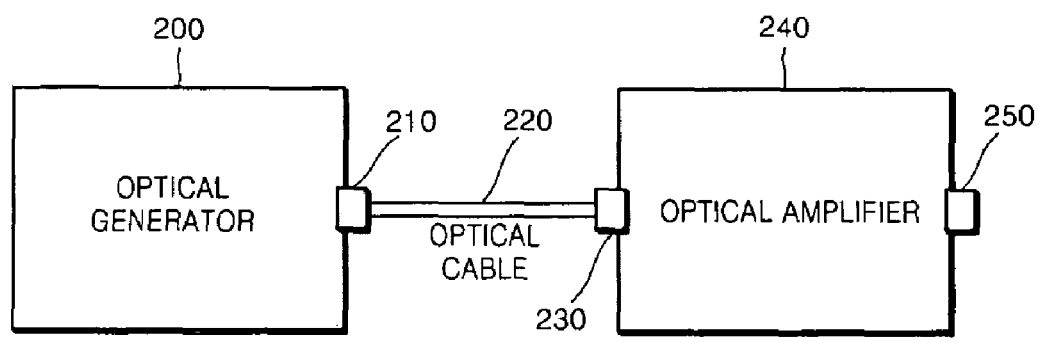
FIG. 2 is a block diagram of a conventional optical Tx module designed to obtain high power optical power.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their descriptions will not be repeated.

Figure 3:
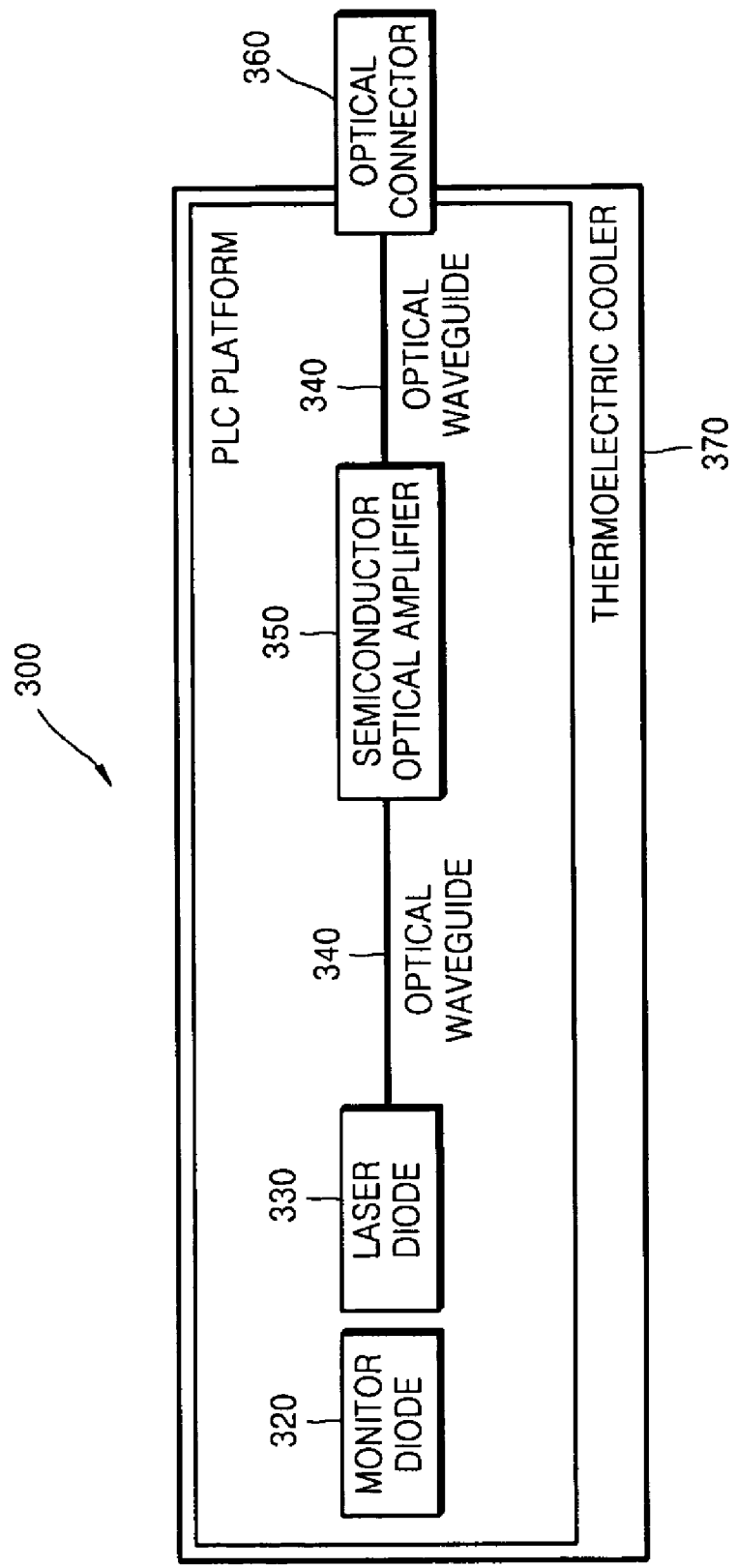
FIG. 3 is a block diagram of a high power planar lightwave circuit (PLC) optical Tx module according to an embodiment of the present invention.

FIG. 3 is a block diagram of a high power planar lightwave circuit (PLC) optical transmission (Tx) module 300 according to an embodiment of the present invention. Referring to FIG. 3, the high power PLC optical Tx module 300 includes a PLC platform 310, a monitor photodiode (mPD) 320, a laser diode (LD) 330, an optical waveguide 340, a semiconductor optical amplifier (SOA) 350, an optical connector 360, and a thermoelectric cooler (TEC) 370.

The high power PLC optical Tx module 300 is located in an optical line terminal (OLT) of a passive optical network (PON) system.

The LD 330 converts an electrical signal into an optical signal having a predetermined wavelength.

The mPD 320 monitors the optical signal generated by the LD 330.

The optical signal generated by the LD 330 is output to the SOA 350 through the optical waveguide 340.

The SOA 350 amplifies the input optical signal to produce an optical signal with high optical power.

Since the strength of the optical signal input to the SOA 350 is limited to -2 to 0 dBm, optical coupling efficiency between the LD 330 and the optical waveguide 340 does not need to be high in the high power PLC optical Tx module 300 illustrated in FIG. 3 if the optical power output from the LD 330 is sufficiently high. That is, if the optical power output from the LD 330 is greater than 5 dBm, high optical coupling efficiency is not required between the LD 330 and the optical waveguide 340. Therefore, when the LD 330 has an optical power of 5 dBm, a process of coupling the LD 330 to the PLC platform 310 does not require high optical coupling efficiency, which is advantageous in terms of productivity.

For example, if the LD 330 has an output optical power of 5 dBm and the alignment accuracy between the LD 330 and the optical waveguide 340 is approximately ±2 μm, optical coupling loss is approximately 5 dB. Therefore, the actual optical power input to the SOA 350 is 0 dBm.

This means that when the LD 330 has an output optical power of greater than 5 dBm, the alignment accuracy between the LD 330 and the optical waveguide 340 can be as low as approximately ±2 μm in order to adjust the optical power input to the SOA 350 to 0 dBm.

On the other hand, when the optical power of the LD 330 ranges from -2 to 0 dBm, the coupling efficiency between the LD 330 and the optical waveguide 340 should be as high as possible. In this case, it is possible to lower an optical coupling loss to less than 2 dB by using a spot size converter (SSC) LD having an optical signal condensing function as the LD 330.

The optical signal output from the LD 330 is condensed while propagating through the optical waveguide 340, and is input to the SOA 350 for optical amplification. At this time, optical coupling loss occurs between the optical waveguide 340 and the SOA 350. In order to decrease the optical coupling loss, an SSC SOA having an optical signal condensing function may be used as the SOA 350.

The optical signal amplified at the SOA 350 is output to the optical connector 360 through the optical waveguide 340.

The optical connector 360 outputs the optical signal to a splitter (not shown), and the splitter splits the optical signal and outputs the split optical signals to a plurality of ONTs, which are subscriber terminals.

Here, the splitter receives the optical signal transmitted from the OLT to the ONT (a downlink optical signal) amplified by the SOA 350, splits the amplified optical signal into a plurality of split signals, and outputs the split signals to the plurality of ONTs.

The PLC platform 310 incorporates the mPD 320, the LD 330, the optical waveguide 340, and the SOA 350 into one package to allow the optical signal to be output with high power.

Particularly, the PLC platform 210 improves the degree of integration and decreases the size of the high power PLC optical Tx module 300 by packaging the mPD 320, the LD 330, the optical waveguide 340, and the SOA 350 as one.

Figure 4:
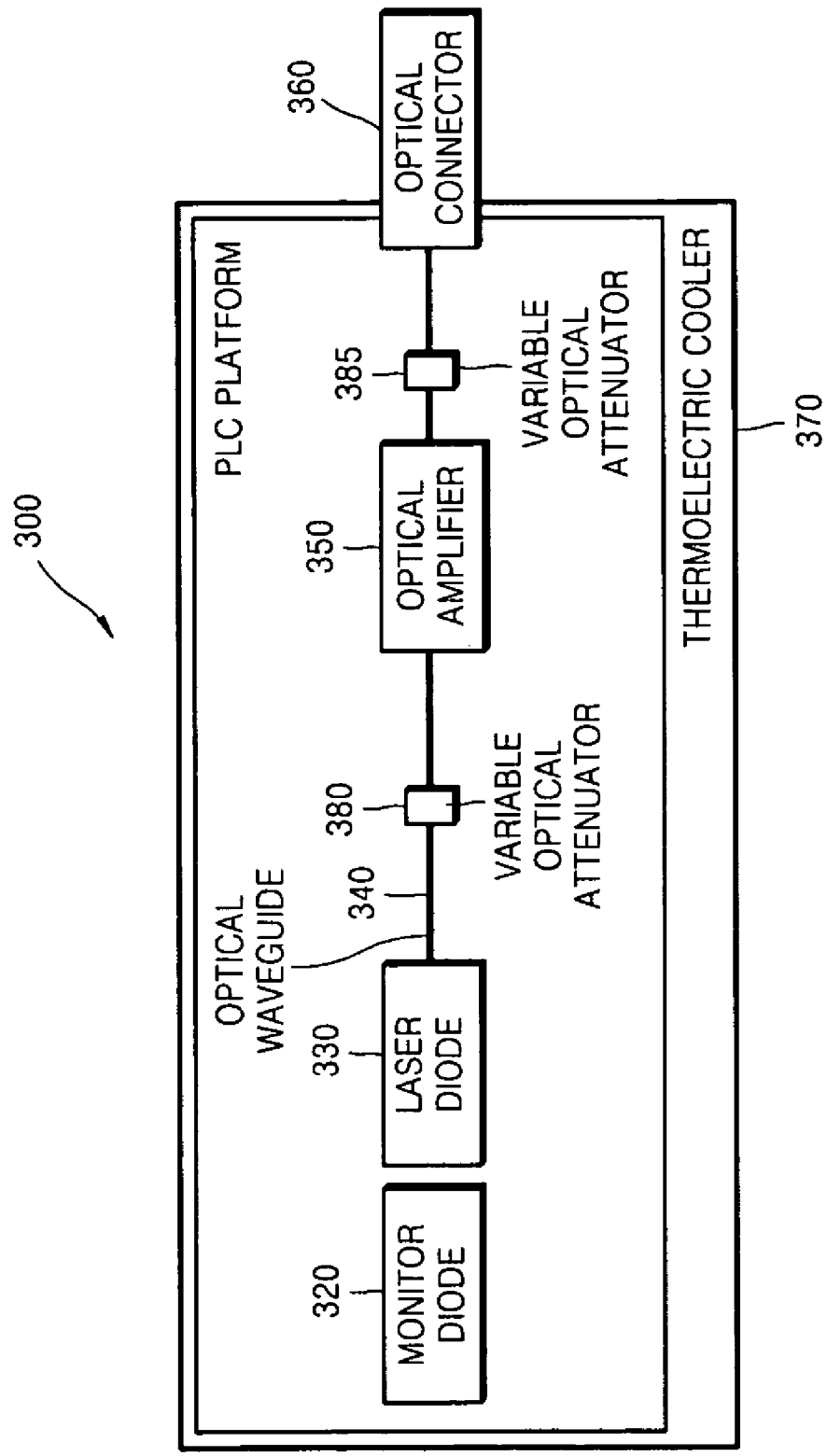
FIG. 4 is a block diagram of a high power PLC optical Tx module including a variable optical attenuator (VOA) according to an embodiment of the present invention.

FIG. 4 is a block diagram of a high power PLC optical Tx module including variable optical attenuators (VOAs) 380 and 385.

In FIG. 3, the optical power input to the SOA 350 is limited. Since the optical alignment between the LD 330 and the optical waveguide 340 and the optical alignment between the optical waveguide 340 and the SOA 350 are specified during a manufacturing process, it is difficult to adjust the optical power input to the SOA 350 with the structure illustrated in FIG. 3.

Accordingly, referring to FIG. 4, the VOA 380 may be disposed along the optical waveguide 340 between the LD 330 and the SOA 350 in order to ensure that constant optical power is input to the SOA 350 regardless of a coupling loss error generated during a manufacturing process. That is, The VOA 380 along the optical waveguide 340 between the LD 330 and the SOA 350 can control the optical power input to an input terminal of the SOA 350.

Also, the VOA 385 is disposed along the optical waveguide 340 between an output terminal of the SOA 350 and the optical connector 360 to control the output optical power of the PLC optical Tx module. Therefore, the VOA 385 can output constant optical power to the splitter regardless of an optical alignment error that may arise when the LD 330 is coupled to the SOA 350 on the PLC platform 310.

Figure 5:
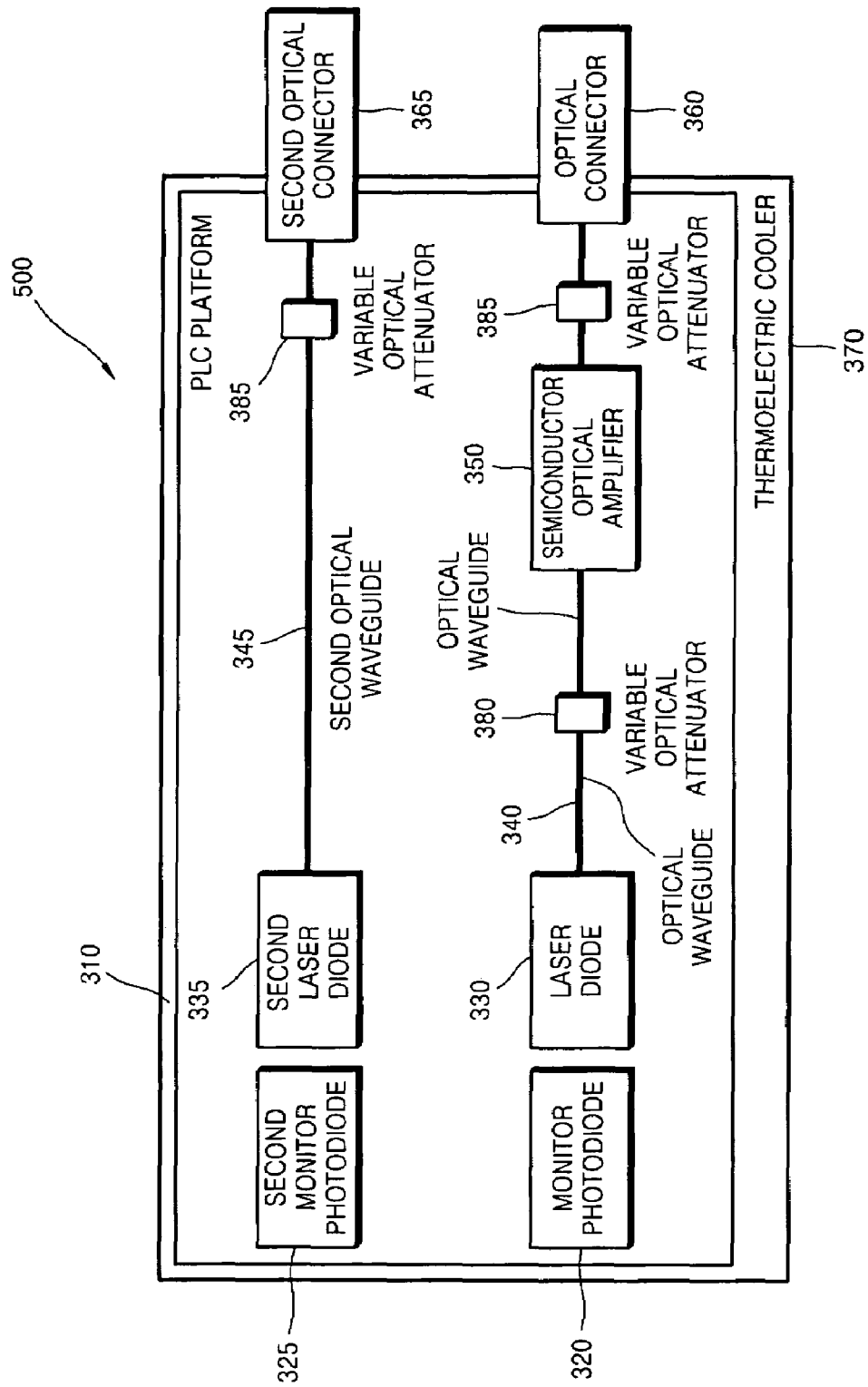
FIG. 5 is a block diagram of a high power PLC optical Tx module having a dual optical waveguide structure according to an embodiment of the present invention.

FIG. 5 is a block diagram of a high power PLC optical Tx module 500 having a dual optical waveguide structure according to an embodiment of the present invention.

A PON system may control a plurality of ONTs, which are subscriber terminals, using 1×16, 1×32, 1×64, and 1×128 splitters. That is, various network constructions may be required, for example, for a network including 16 ONTs for each OLT through 16 branches, and for a network including 128 ONTs for each OLT through 128 branches.

For example, a network including 128 ONTs needs a power optical Tx module that generates more than +10 dBm of power. The high power can be obtained by adding the SOA 350 to the optical Tx module.

However, since a network including 16 ONTs does not need high power, the SOA 350 does not need to be included in the optical Tx module when 16 ONTs are included.

As described above, an optical Tx module necessarily needs an SOA in order to include various numbers of subscribers of 16 to 128 ONTs. Accordingly, the cost increases when the optical Tx module is used for a system that is designed specifically for 16 to 32 ONTs.

Referring to FIG. 5, the high power PLC optical Tx module 500 has a dual optical waveguide structure including an optical waveguide 340 along which the SOA 350 is disposed, and a second optical waveguide 345 along which no SOA is disposed.

Referring to FIG. 5, in the high power PLC optical Tx module 500, the optical waveguide 340 leads to more than 64 ONTs and requires the SOA 350, and the second optical waveguide 345 leads to 16 to 32 ONTs and does not require an SOA. Here, the optical waveguides 340 and 345, which constitute the double optical waveguide structure, are formed on one PLC platform 310.

That is, two optical waveguides are implemented in the high power PLC optical Tx module: the optical waveguide 340 along which the SOA 350 is disposed so that more than 64 ONTs can be connected to the optical waveguide 340, and the second optical waveguide 345 along which no SOA is not disposed so as to be applied to 32 ONTs or less.

As described above, between 16 and 128 ONTs can be connected to one PLC platform 310 by allowing the optical Tx module to select the optical waveguide according to the number of ONTs.

A second mPD 325 performs the same function as the mPD 320. That is, the second mPD 325 monitors an optical signal generated by a second LD 335.

The second LD 335 converts an electrical signal into an optical signal having the same wavelength as the optical signal generated by the LD 330.

Figure 6:
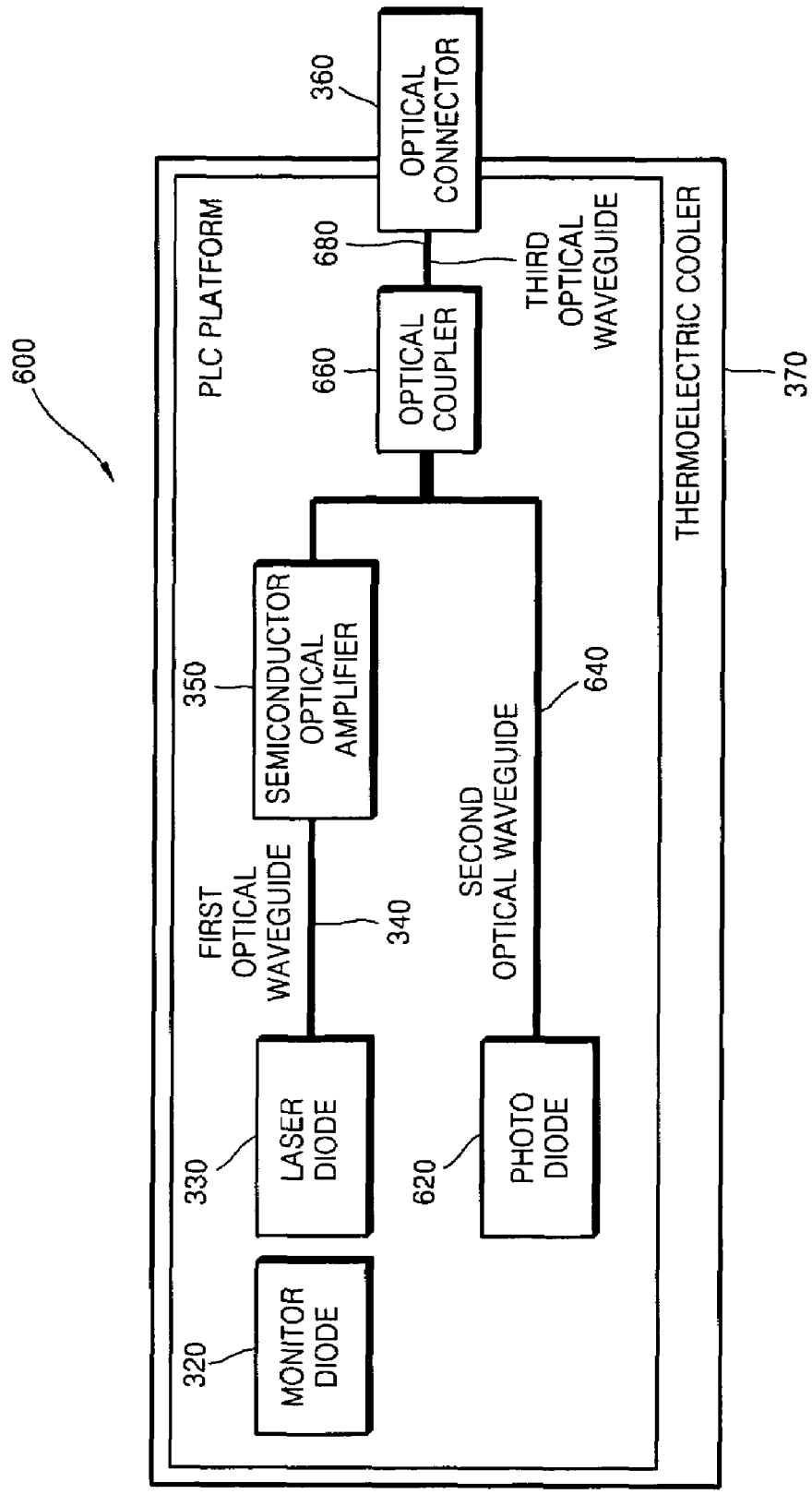
FIG. 6 is a block diagram of a high power PLC optical Tx/reception (Rx) module according to an embodiment of the present invention.

The VOA 385 is connected between the second LD 335 and a second optical connector 365, and adjusts the optical power output to the splitter through the second optical connector 365, FIG. 6 is a block diagram of a high power PLC optical Tx/reception (Rx) module 600 according to an embodiment of the present invention.

A PON system is based on two-way communication between an OLT and an ONT. A communication flow from the OLT to the ONT is a downlink, and a communication flow from the ONT to the OLT is an uplink. Here, communication between the OLT and the ONT uses a single line of an optical waveguide. For discrimination of a downlink signal and an uplink signal, the downlink signal is transmitted using a 1500 nm wavelength band (more specifically, 1450 nm-1590 nm), while the uplink signal is transmitted using a 1300 nm wavelength band (more specifically, 1280 nm-1350 nm).

Accordingly, the optical Tx module outputs a downlink signal from the OLT, and the optical Rx module processes an uplink signal from the ONT.

To miniaturize and reduce costs of an optical communication module applied to a PON system, an optical Tx/Rx module, which implements an optical Tx module and an optical Rx module in a single module, has been generally used. The high power PLC optical Tx/Rx module 600 is manufactured by adding an optical Rx module to a high power PLC optical Tx module.

Referring to FIG. 6, the high power PLC optical Tx/Rx module 600 includes an optical Tx module and an optical Rx module implemented on a PLC platform 310. The high power PLC optical Tx/Rx module 600 includes a mPD 320, a LD 330, a first optical waveguide 340, a semiconductor optical amplifier 350, a photodiode 620, a second optical waveguide 640, an optical coupler 660, a third optical waveguide 680, and an optical connector 360.

The first optical waveguide 340 connects the LD 330 to the SOA 350, and connects the SOA 350 to the optical coupler 660. The second optical waveguide 640 connects the optical coupler 660 to the photodiode 620, and the third optical waveguide 680 connects the optical coupler 660 to the optical connector 360.

A transmission optical signal in a 1500 nm wavelength band passes through the first optical waveguide 340, which corresponds to a Tx terminal. A reception optical signal in a 1300 nm wavelength band passes through the second optical waveguide 640, which corresponds to an Rx terminal. The transmission optical signal in the 1500 nm wavelength band and the reception optical signal in the 1300 nm wavelength band both pass through the third optical waveguide 680.

The transmission optical signal in the 1500 nm band is generated by the LD 330 and the SOA 350 connected to each other by the first optical waveguide 340, passes through the optical coupler 660 and the third optical waveguide 680, and is output to an optical cable and transmitted to a splitter through the optical connector 360.

The reception optical signal in the 1300 nm band is input from the splitter, passes through the optical connector 360, the third optical waveguide 680 and the optical coupler 660, and is input to the photodiode 620 along the second waveguide 640.

The optical Tx function in the high power PLC optical Tx/Rx module 600 is described above with reference to FIG. 3.

The photodiode 620 receives an optical signal and converts the received optical signal into an electrical signal. That is, the photodiode 620 performs an optical signal reception function in the high power PLC optical Tx/Rx module 600.

The optical coupler 660, which divides or combines the wavelengths of a transmission optical signal and a reception optical signal, is disposed between the SOA 350 and the optical connector 360 in the case of the transmission optical signal, and disposed between the photodiode 620 and the optical connector 360 in the case of the reception optical signal.

The optical connector 360 outputs the optical signal amplified by the SOA 350 to an optical cable 120 (see FIG. 1) connected to the splitter, and transmits the optical signal input from the splitter to the third optical waveguide 680 on the PLC platform 310.

The splitter outputs a downlink optical signal amplified by the SOA 350 to a plurality of ONTs, and outputs an uplink optical signal input from one of the plurality of ONTs to the photodiode 620 through the second optical waveguide 640.

The photodiode 620, the mPD 320, the LD 330, the SOA 350, the first optical waveguide 340, the second optical waveguide 640, the optical coupler 660, and the third optical waveguide 680 are incorporated into one package on the PLC platform 310 to allow the output of an optical signal of a high power.

Particularly, when the photodiode 620, the mPD 320, the LD 330, the SOA 350, the optical waveguide 340, the second optical waveguide 640, the optical coupler 660, and the third optical waveguide 680 are incorporated into one package in the high power PLC optical Tx/Rx module 600, the PLC platform 310 is used to achieve high integration and a reduction in the size of the optical TX/Rx module.

Figure 7:
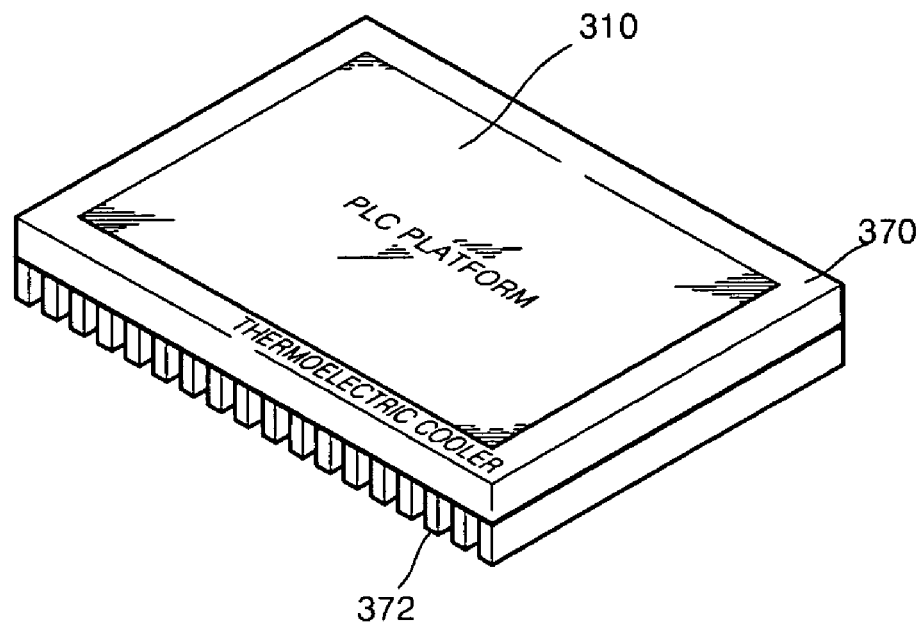
FIG. 7 is a perspective view of a thermoelectric cooler used in the modules illustrated in FIGS. 3 through 6.

FIG. 7 is a perspective view of a thermoelectric cooler applied to the modules of FIGS. 3 through 6.

When the high power PLC optical Tx module or Tx/Rx module is implemented, the use of the PLC platform results in the emission of a large amount of heat. That is, active devices included in the high power PLC optical Tx module or Tx/Rx module, such as a LD and a SOA, require large currents. In addition, much heat is emitted when an electrical signal is converted into an optical signal.

Because silica material, which is used to form the PLC platform, has lower thermal conductivity than metal, internal temperature of the LD and the SOA of the LD and SOA increases and the optical power thereof decreases, the longer the LD and the SOA located on the PLC platform operate.

In order to prevent the performance decrease of the PLC platform, the internal temperatures of the LD and the SOA are regulated by mounting the thermoelectric cooler 370 on the PLC platform 310, as illustrated in FIG. 3.

The operating principle of the thermoelectric cooler 370 will now be described. The thermoelectric cooler 370 reduces its surface temperature when an electrical signal is applied by emitting heat toward the backside of the thermoelectric cooler 370. The backside of the thermoelectric cooler 370 contacts a metal cooling plate 372 so that the heat emitted to the backside of the thermoelectric cooler 370 may be transferred to the outside without influencing the PLC platform 310. Also, the metal cooling plate is connected to a heatsink plate structure having an uneven surface or a crumpled surface, as illustrated in FIG. 7, in order to efficiently emit the heat.

Each of the high power PLC optical Tx modules and Tx/Rx modules illustrated in FIGS. 3 through 6 includes the thermoelectric cooler 370 under the PLC platform 310 as illustrated in FIG. 7.

Figure 8:
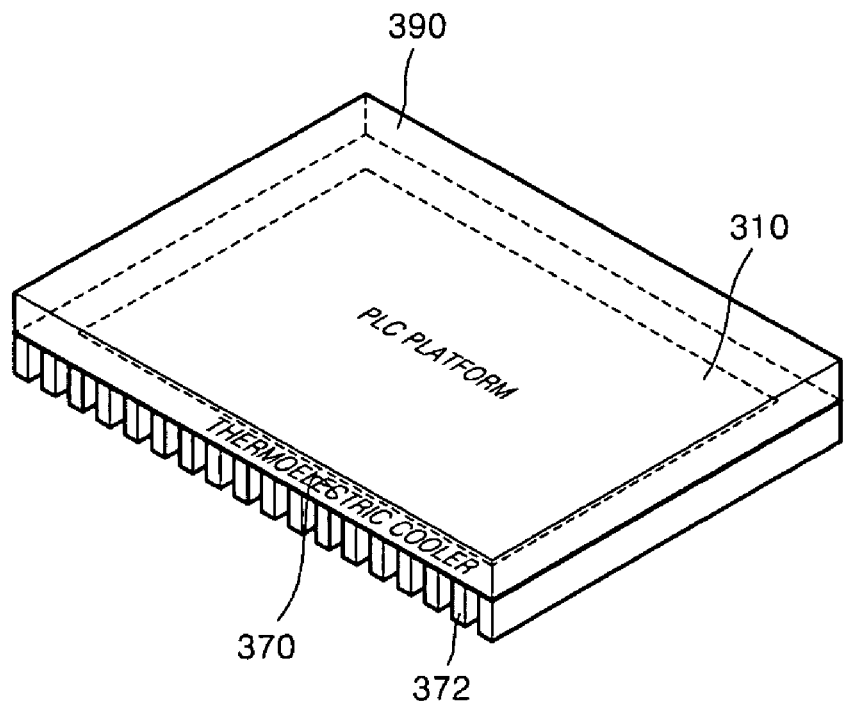
FIG. 8 is a perspective view of a hermetically sealed high power PLC optical Tx module or Tx/Rx module of one of FIGS. 3 through 6.

FIG. 8 is a perspective view of a hermetically sealed high power PLC optical Tx module or Tx/Rx module of one of FIGS. 3 through 6. Referring to FIG. 8, when a LD, a SOA, a photodiode, etc., located on the PLC platform 310 in the high power PLC optical Tx module or Tx/Rx module of one of FIGS. 3 through 6, are exposed to the atmosphere, the performance or lifespan of each of the elements is reduced by various factors.

Accordingly, in order to isolate a LD, a SOA, a photodiode, etc., located on the PLC platform 310, from the atmosphere and stably operate them, the exterior surface of the high power PLC optical Tx module or Tx/Rx module is completely enclosed by a metallic material through a hermetic sealing process.

The high power PLC optical Tx module and Tx/Rx module according to the present invention have the following effects.

The high power optical Tx/Rx module structure is capable of securing a large number of ONTs (subscribers) for one OLT in a PON system.

The high power optical Tx module or Tx/Rx module can be make to a small size at relatively low costs by integrating the laser diode generating an optical signal for transmission, the semiconductor optical amplifier generating a high power optical signal by amplifying the generated optical signal, and the photodiode of the optical reception unit processing an uplink signal from the ONT, etc. on one PLC platform.

Also, the present invention implements a PON system including more than 128 ONTs for one OLT, and consequently, allows a decrease in the cost of the entire PON system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A passive optical network system comprising:
   an optical line termination (OLT) having a single package high power planar lightwave circuit (PLC) optical transmission (Tx) module, the single package PLC optical Tx module comprising:
      a laser diode generating an optical signal of a single predetermined wavelength;
      a semiconductor optical amplifier (SOA) receiving and amplifying the optical signal generated by the laser diode and outputting the amplified optical signal; and
      a PLC platform incorporating the laser diode and the SOA into one package to allow an optical signal to be output with high power; and
   a splitter receiving the amplified optical signal and splitting the received amplified optical signal into a plurality of optical signals each having the single predetermined wavelength.

2. The passive optical network system of claim 1, further comprising a monitor photodiode (mPD) monitoring the optical signal generated by the laser diode.

3. The passive optical network system of claim 1, wherein the laser diode is an SSC laser diode comprising a spot size converter (SCC) having an optical signal condensing function.

4. The passive optical network system claim 1, wherein the SOA is an SSC SOA comprising an SSC having an optical signal condensing function.

5. The passive optical network system of claim 1, further comprising a variable optical attenuator (VOA) located at a predetermined point along an optical waveguide connecting the laser diode to the SOA to control the optical power of the optical signal output from the laser diode such that the optical power of the optical signal input to the SOA is constant.

6. The passive optical network system of claim 1, further comprising an optical connector connecting the SOA to the splitter.

7. The passive optical network system of claim 6, further comprising a VOA located at a predetermined point along the optical waveguide connecting the SOA to the optical connector such that the optical power of the optical signal output from the SOA is constant.

8. The passive optical network system of claim 1, further comprising:
   a second laser diode generating an optical signal of the same wavelength as the optical signal generated by the laser diode, wherein the second laser diode is incorporated into the PLC platform; and
   a second optical waveguide that outputs the optical signal generated by the second laser diode to the splitter without passing through the SOA.

9. The passive optical network system of claim 1, further comprising a thermoelectric cooler located on the PLC platform to exhaust heat generated by the high power PLC optical Tx module.

10. The passive optical network system of claim 9, wherein the thermoelectric cooler comprises a cooling plate that is formed of metaland has one of an uneven surface and a crumpled surface.

11. The passive optical network system of claim 1, being hermetically sealed with metal so isolated from the outside.

12. A passive a tical network system comprising:
   an optical line termination (OLT) having a high power planar lightwave circuit (PLC) optical transmission/reception (Tx/Rx) module comprising:
      a photodiode converting an input optical signal into an electrical signal;
      a laser diode generating first optical signal of a first wavelength;
      an SOA amplifying the first optical signal generated by the laser diode;
      an optical coupler outputting the amplified first optical signal, receiving a second optical signal having a second wavelength and dividing the second optical signal, and outputting the divided second optical signal to the photodiode; and
      a PLC platform incorporating the photodiode, the laser diode, the SOA, and the optical coupler into one package to allow an optical signal to be output with high power;
   a splitter receiving the amplified first optical signal from the optical coupler to split the amplified first optical signal into a plurality of optical signals each havin the first predetermined wavelength and providing the second optical signal to the optical coupler.

13. The passive optical network system of claim 12, further comprising an mPD monitoring the first optical signal generated by the laser diode.

14. The passive optical networks system of claim 12, wherein the laser diode is an SSC laser diode comprising an SSC having an optical signal condensing function.

15. The passive optical network system of claim 12, wherein the SOA is an SSC SOA comprising an SSC having an optical signal condensing function.

16. The passive optical network system of claim 12, further comprising a VOA located at a predetermine point along an optical waveguide connecting the laser diode to the SOA and/or an optical waveguide connecting the SOA to the optical coupler, to control the optical power of an optical signal.

17. The passive optical network system of claim 12, further comprising an optical connector connecting the optical coupler to the splitter.

18. The passive optical network system of claim 12, further comprising a thermoelectric cooler located on the PLC platform to exhaust heat generated by the high power PLC optical Tx/Rx module.

19. The passive optical network system of claim 18, wherein the thermoelectric cooler comprises a cooling plate that is formed of metal and has one of an uneven surface and a crumpled surface.

20. The passive optical network system of claim 12 being hermetically sealed with metal so isolated from the outside.

* * * * *